United States Patent [19]
Carbonetta, Jr.

[11] 4,001,720
[45] Jan. 4, 1977

[54] GAS LASER
[75] Inventor: Reno Raymond Carbonetta, Jr., Lancaster, Pa.
[73] Assignee: RCA Corporation, New York, N.Y.
[22] Filed: May 30, 1975
[21] Appl. No.: 582,370
[52] U.S. Cl. .................. 331/94.5 G; 331/94.5 T; 331/94.5 P; 330/4.3
[51] Int. Cl.² .......................................... H01S 3/03
[58] Field of Search ............... 331/94.5; 330/4.3
[56] References Cited
UNITED STATES PATENTS
3,745,483  7/1973  Huchital et al. ............ 331/94.5 G
FOREIGN PATENTS OR APPLICATIONS
46-20466  6/1971  Japan ........................ 331/94.5 G OTHER PUBLICATIONS
Huchital et al., Rev. of Sci. Instrum, vol. 39, No. 10, Oct. 1968, pp. 1472–1477.

Primary Examiner—Robert J. Webster
Attorney, Agent, or Firm—Glenn H. Bruestle; George E. Haas

[57] ABSTRACT

A laser device has a bore formed by aligned apertured carbon discs with the ratio of the pitch distance between adjacent discs to the diameter of the apertures through the discs being between 1.8 and 3.0. An optimum value of this ratio is 2.2. The pitch distance is the distance from one surface of a carbon disc to the corresponding surface on an adjacent disc; this distance being measured parallel to the bore axis. This relationship of aperture diameter to pitch distance substantially eliminates sputtering of the carbon discs and gas clean-up during laser operation.

3 Claims, 2 Drawing Figures

GAS LASER

BACKGROUND OF THE INVENTION

This invention is directed to a laser device having a closed envelope with a gaseous filling within the envelope. Because of the high operating temperature of the gaseous discharge within the envelope, the discharge is confined to a bore passage formed by a longitudinally extending array of carbon discs each having an aperture through its central portion. A cathode electrode is positioned adjacent to one end of the array of discs and an anode electrode is positioned at the opposite end to provide a gaseous discharge through the aligned apertures of the discs forming the bore. Reflectors at opposite ends of the bore provide with the bore an optical resonant cavity for the laser.

Laser devices of this type are filled with a suitable noble gas such as argon or krypton. The discharge through the bore provided by the aligned carbon discs is of a nature having a high current density often in the neighborhood of 500 amperes per square centimeter and may go as high as 1000 amperes per square centimeter, at gas pressures in the order of 1/10th of a torr. As described in U.S. Pat. No. 3,522,551, gas ion lasers of this type and operating within a high range of current density undergo a sputtering erosion of the carbon discs confining the discharge plasma, as well as a cleanup of the gas within the tube. The sputtering erodes the surfaces of the carbon discs forming the openings of the apertures extending through the carbon discs. The sputtered carbon is deposited within the central portions of the apertures between the openings, as well as on other surfaces within the envelope. The build-up of carbon within the central portions of one or more of the disc apertures forms a smaller bore for the plasma discharge. This, together with a drop in gas pressure results in an increase in the voltage drop across the discharge. The current density increases as well as the temperature and thermal dissipation through the carbon discs to the envelope of the tube. The reduction in the apparent bore size and hence of the laser beam causes excessive defraction loss and thus reduces the output beam of the device. These factors tend to shorten the lifetime of the tube.

SUMMARY OF THE INVENTION

In accordance with the invention, a laser device having a bore formed by aligned carbon discs is designed with carbon discs having a specific relationship between the diameter of the apertures through the discs and the pitch distance between adjacent discs; the pitch distance being the distance from one surface of a carbon disc to the corresponding surface on an adjacent disc; this distance being measured parallel to the bore axis. Specifically, it as been found that the sputtering and clean-up effects taking place within the tube can be substantially eliminated, if the ratio of the pitch distances between adjacent discs and the diameter of the disc apertures is between 1.8 and 3.0. An optimum value of this ratio is 2.2. Furthermore, with these values of the pitch to bore ratio, tubes can be operated at less than 500 amperes per square centimeter and provide an equivalent performance to the higher current density tubes. The life of these laser tubes is greatly determined by their current density in an indirect ratio.

DETAILED DESCRIPTION OF THE PREFERRED EMBODIMENT

Figure 1:
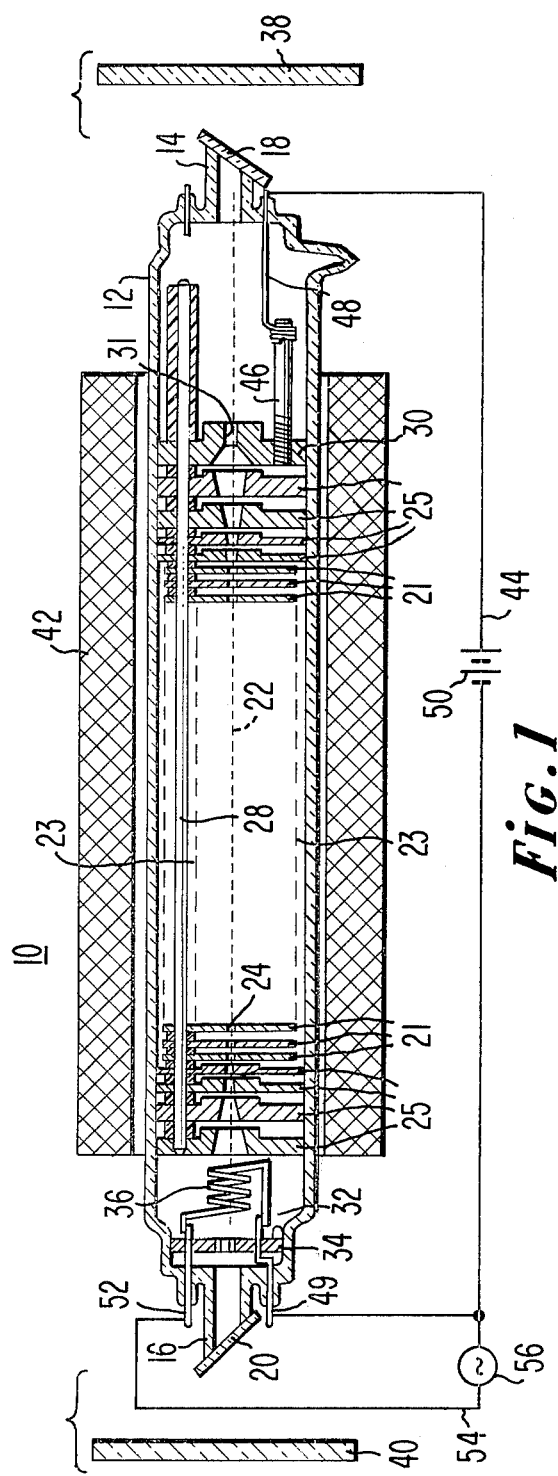
FIG. 1 is a longitudinal sectional view of a laser device, in accordance with the invention.

In FIG. 1 the laser device 10 comprises a hermetically sealed envelope 12 formed of a tubular piece of quartz glass having at opposite ends reduced tubular extensions 14 and 16 closed by Brewster windows 18 and 20. Longitudinally extending through the tube 12 is an array of carbon discs 21 each having an aperture 24 through the center. Only a few of the discs 21 are shown in FIG. 1, to simplify the drawing, but extend in spaced alignment the whole distance indicated by the dotted lines 23 between end discs 25 and with their central apertures 24 concentric to a common axis 22. As disclosed specifically in FIG. 2, the discs 21 between the ends of the array are substantially of the same size, having a central aperture 24. The adjacent discs are spaced from each other by ceramic spacer tubes 26 of a high alumina content.

The discs 25 at both ends of the array, as disclosed in FIG. 1, have tapered apertures of increasing width toward the ends of the disc array. These tapered apertures form transition zones for the discharge plasma. The array of discs are threaded on three ceramic rods 28, only one of which is shown, with tubular ceramic spacers 26 positioned between adjacent discs. The three rods 28 are equally spaced around the central axis 22.

The aligned apertures 24 of the discs array form a bore and passageway through the array, extending from an anode electrode 30 to a cathode electrode 32. Anode 30 is also an apertured carbon disc having a central passageway 31 therethrough as an extension of the laser bore. The cathode 32 may be a short tungsten metal helix 36 impregnated with thermal electron emitting material, such as barium aluminate. The helix 36 is coaxially aligned on the common axis 22 and forms an extension of the laser bore. The ends of the cathode helix 36 are connected respectively to supporting lead pins 49 and 59 sealed through the end of glass envelope 12.

Figure 2:
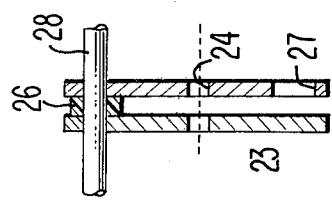
FIG. 2 is an enlarged view of a pair of carbon discs of the device of FIG. 1.

Each disc 21 and 25 has a second gas relief aperture 27, formed through the disc in an off-axis position as shown in FIG. 2. The gas-relief apertures are purposely not aligned so that a gaseous discharge will not be formed through these apertures between the cathode and anode electrodes. These relief apertures 27 equalize gas pressure between the carbon discs.

Spaced from the respective Brewster angle windows 18 and 20 at opposite ends of the laser envelope 12 are a pair of reflective mirrors 38 and 40 aligned normal to the common axis 22 of the laser device. The mirrors 38 and 40 provide with the laser bore an optical resonant cavity. A magnetic yoke 42 consisting of a plurality of permanent bar magnets surrounds the tubular envelope 12 to provide an axial magnetic field for confining the plasma discharge to a path through the bore of the laser. The anode electrode 30 is connected into an external circuit 44 through a conductor 46 making contact with a lead-in pin 48 extending through the end of the glass envelope 12. In a similar manner, the cathode lead-in pin 49 is connected to the external circuit 44. Circuit 44 has a source 50 of direct current. The cathode helix 36 is directly heated by a source 56 of a.c. or d.c. electrical energy electrically connected by circuit 54 and the lead pins 49 and 59 to the helix 36.

As described above, the formation of a lasing discharge plasma between the electrodes 30 and 32 and through the bore formed by the central apertures through the carbon discs 21 and 25, initiates severe problems of sputtering of the carbon of the discs as well as a gas clean-up. It has been found, however, that these deleterious effects of laser operation can be substantially eliminated by dimensioning the carbon discs within a small range of values.

A specific tube of the type described is one utilizing an argon gaseous filling within the tube envelope. The apertures 24 through each of the central discs 21 are 1.1 mm. in diameter. It has been found with this particular tube that if the central discs 23 are formed of right circular cylinders and are spaced a critical distance from each other, both sputtering and gas clean-up is minimized. These results are obtained when the ratio of pitch distance between adjacent discs to the diameter of the apertures 24 is between 1.8 and 3.0. The pitch distance is defined as the distance parallel to the bore axis from one surface of a disc to the corresponding surface of an adjacent disc. Optimum operation of the device is when the ratio has a value of about 2.2.

These ratios of pitch to aperture diameter are not limited to the specific laser device described, but are of value in other laser devices having different dimensions of disc apertures and spacing. Optimum results are realized when the gas relief apertures 27 are sufficiently large so that there is an unrestrained flow of gas back to the cathode to equalize the gas pressure through the tube. This eliminates a pumping action which would occur if the apertures 27 are small causing a pressure drop at the cathode. Under such conditions the active discharge region through the bore of the device is starved by the unequal gas pressure set up.

With the above values of pitch to bore ratio, the laser tubes provide an operational performance equivalent to tubes operating at higher current densities which are fabricated without this invention. The invention extends the operational life of the tubes, as tube life is in an indirect ratio to the current density at which the tube operates. Laser tubes equivalent to those operating without the invention with a current density between 500 and 550 amperes per square centimeter, now with the invention operate at around 400 amperes per square centimeter and provide an equivalent performance. These tubes using the invention have an increase in tube life by a factor of 7 to 10. For example, life of the improved tubes has been extended to over 4000 hours from a lifetime of between 500 hours and 700 hours for equivalent tubes not using this invention.

I claim:

1. A laser device comprising a closed envelope, a gaseous filling within said envelope, a longitudinally extending array of carbon discs within said envelope each disc having an aperture through the central portion thereof, said discs being equally spaced from each other, said apertures being round with substantially equal diameters, the centers of said apertures being aligned on a common axis to form a straight line bore through said array of discs, a cathode electrode and an anode electrode adjacent to opposite ends of said array of discs to form a gaseous discharge through said bore, a first reflector aligned with said common axis at one end of said envelope and a second reflector aligned with said common axis at the other end of said envelope, said reflectors forming with said bore an optical resonant cavity, the ratio of the pitch distance between adjacent discs and the diameter of said aperture being between 1.8 and 3.0.

2. A gas laser device in accordance with claim 1, wherein said ratio of pitch distance to aperture diameter is substantially 2.2.

3. A gas laser device in accordance with claim 1, wherein said diameter of said apertures is substantially 1.1 millimeters.

* * * * *